(12) United States Patent
Chan

(10) Patent No.: US 10,731,697 B2
(45) Date of Patent: Aug. 4, 2020

(54) SWIVEL SNAPHOOK

(71) Applicant: Duraflex Hong Kong Limited, Hong Kong (CN)

(72) Inventor: Yick Fai Chan, Hong Kong (CN)

(73) Assignee: Duraflex Hong Kong Limited, Hong Kong (CN)

(\*) Notice: Subject to any disclaimer, the term of this patent is extended or adjusted under 35 U.S.C. 154(b) by 0 days.

(21) Appl. No.: 16/470,646

(22) PCT Filed: Dec. 11, 2017

(86) PCT No.: PCT/CN2017/115410
§ 371 (c)(1),
(2) Date: Jun. 18, 2019

(87) PCT Pub. No.: WO2018/121230
PCT Pub. Date: Jul. 5, 2018

(65) Prior Publication Data
US 2019/0323548 A1    Oct. 24, 2019

(30) Foreign Application Priority Data

Dec. 29, 2016  (CN) .......................... 2016 2 1463756

(51) Int. Cl.
*F16B 45/02* (2006.01)
*F16G 15/08* (2006.01)

(52) U.S. Cl.
CPC .............. *F16B 45/02* (2013.01); *F16G 15/08* (2013.01)

(58) Field of Classification Search
CPC .......... F16B 45/02; F16G 15/08; A44B 13/00; Y10T 24/4755
See application file for complete search history.

(56) References Cited

U.S. PATENT DOCUMENTS 5,127,137 A \*  7/1992  Krauss ................... F16B 45/00
                                                                24/265 H
5,146,657 A    9/1992  Frano
                 (Continued)

FOREIGN PATENT DOCUMENTS

CN      104640471 A     5/2015
CN      105188454 A    12/2015
                 (Continued)

OTHER PUBLICATIONS

International Search Report of PCT/CN2017/115410, dated Mar. 8, 2018.

*Primary Examiner* — Robert Sandy
*Assistant Examiner* — Louis A Mercado
(74) *Attorney, Agent, or Firm* — Collard & Roe, P.C.

(57) ABSTRACT

A swivel snaphook has a hook and a retainer. The retainer has a support portion and a strap mounting portion. The support portion has a base body connected to the strap mounting portion, a through hole passing through the base body, and a snap-in portion protruding from the surface of the base body and surrounding the through hole. The hook has a hook and connector portion and an engaging portion. The engaging portion has a connecting shaft connected to the hook and connector portion, and a snap-on portion. When the hook and the retainer are snap-fitted together, the snap-on portion surrounds the snap-in portion and fits with the snap-in portion in an inverted manner.

9 Claims, 9 Drawing Sheets

(56) References Cited

U.S. PATENT DOCUMENTS

| | | | | | |
|---|---|---|---|---|---|
| 5,253,396 | A | * | 10/1993 | Rekuc | F16B 45/00 24/600.9 |
| 5,274,887 | A | * | 1/1994 | Fudaki | A44B 11/28 24/265 H |
| 5,365,642 | A | * | 11/1994 | Rekuc | F16B 45/00 24/598.7 |
| 5,398,389 | A | * | 3/1995 | Terada | F16B 45/02 24/599.6 |
| 5,438,736 | A | * | 8/1995 | Terada | F16B 45/02 24/265 H |
| 5,450,661 | A | * | 9/1995 | Rekuc | F16B 45/00 24/598.5 |
| 5,475,901 | A | * | 12/1995 | Anscher | F16B 21/073 24/265 H |
| 5,502,878 | A | | 4/1996 | Anscher | |
| 5,546,639 | A | * | 8/1996 | Lacore | B62J 7/08 24/129 R |
| 5,548,875 | A | * | 8/1996 | Hart | F16B 45/02 24/265 H |
| 5,566,428 | A | * | 10/1996 | Takahashi | B29C 45/0017 24/265 H |
| 5,634,246 | A | * | 6/1997 | Jermyn, Jr. | F16B 45/02 24/265 H |
| 10,060,466 | B2 | | 8/2018 | Kaneko et al. | |

FOREIGN PATENT DOCUMENTS

| | | |
|---|---|---|
| CN | 205409977 U | 8/2016 |
| CN | 206390414 U | 8/2017 |
| TW | 304 564 U | 5/1997 |

* cited by examiner

SWIVEL SNAPHOOK

CROSS REFERENCE TO RELATED APPLICATIONS

This application is the National Stage of PCT/CN2017/115410 filed on Dec. 11, 2017, which claims priority under 35 U.S.C. § 119 of Chinese Application No. 2016214637560 filed on Dec. 29, 2016, the disclosures of which are incorporated by reference. The international application under PCT article 21(2) was not published in English.

TECHNICAL FIELD

The present invention relates to the technical field of human daily necessities, and specifically relates to a snaphook.

BACKGROUND ART

Nowadays, swivel snaphooks become increasingly popular in people's daily life. At present, a common commercially available swivel snaphook typically comprises a hook and a retainer that are snap-fitted together and can swivel relative to each other. The retainer comprises a support portion and a strap mounting portion used to connect a fabric strap. The hook comprises a hook and connector portion used to hook an object and a connecting shaft mounted on the support portion. The support portion typically comprises a base body connected to the strap mounting portion and a through hole passing through the base body. The connecting shaft is inserted in the through hole, so that the hook and the retainer are engaged.

Apparently, such a simple engaging method has the following disadvantages: in order to ensure that the connecting shaft can swivel freely relative to the through hole, a gap space is definitely provided between the connecting shaft and the through hole. As a result, the connecting shaft easily rocks and swings relative to the through hole, and undesired collision with the through hole occurs. Not only noises are generated, but more importantly, repeated collisions tend to cause mechanical wear to the connecting shaft or the through hole. Consequently, the connecting shaft is broken or the inner diameter of the through hole increases to separate the connecting shaft from the through hole.

In view of this, it is necessary to design a new swivel snaphook to resolve the foregoing problem.

SUMMARY OF THE INVENTION

Technical Problem

The technical problems to be resolved by the present invention are that in the existing swivel snaphook, a connecting shaft easily rocks and swings relative to a through hole, resulting in collision and causing mechanical wear, and further reducing the service life of the swivel snaphook. A swivel snaphook is thus provided to effectively prevent the connecting shaft from rocking and swinging relative to the through hole, thereby prolonging the service life of the swivel snaphook.

Solution to Problem

Technical Solution

To solve the technical problems mentioned above, the present invention adopts the following technical solutions:

The present invention provides a swivel snaphook, which comprises a hook and a retainer that can be snap-fitted together, wherein the retainer comprises a support portion and a strap mounting portion used to connect a fabric strap, and the hook comprises a hook and connector portion used to hook an object or connect a fabric strap, and an engaging portion connected to the hook and connector portion.

The support portion comprises a base body connected to the strap mounting portion, a through hole passing through the base body, and a snap-in portion protruding from the surface of the base body and surrounding the through hole.

The engaging portion comprises a connecting shaft connected to the hook and connector portion, and a snap-on portion.

When the hook and the retainer are snap-fitted:
the snap-on portion surrounds the snap-in portion and is snap-fitted with the snap-in portion, and the connecting shaft is rotatably inserted in the through hole.

In the swivel snaphook provided in the present invention, the snap-in portion comprises a raised ring protruding from the surface of the base body and a snapping boss extending outward from a tail end of the raised ring;
the snap-on portion comprises a plurality of bosses arranged surrounding the connecting shaft in a centrosymmetric manner;
and when the hook and the retainer are snap-fitted: the plurality of bosses and the snapping boss abut against each other, such that the snap-in portion and the snap-on portion are snap-fitted together in an inverted manner.

In the swivel snaphook provided in the present invention, the snap-in portion further comprises a plurality of notches recessed from an end surface of the raised ring.

In the swivel snaphook provided in the present invention, the boss has an inner side surface forming an acute angle with respect to a vertical plane; the snapping boss has a smooth arc-shaped surface connected to the raised ring, and an abutting surface extending from an end of the arc-shaped surface; and when the hook and the retainer are snap-fitted: the inner side surface abuts against the abutting surface.

In the swivel snaphook provided in the present invention, the snap-on portion comprises two bosses configured opposite each other, and the width of the bosses is greater than the radial width of the connecting shaft.

In the swivel snaphook provided in the present invention, the plurality of bosses are joined to each other to form an annular boss.

In the swivel snaphook provided in the present invention, the boss has a protrusion protruding from the surface of the boss that faces the connecting shaft; and when the hook and the retainer are snap-fitted: the protrusion is snap-fitted with the snapping boss.

In the swivel snaphook provided in the present invention, the hook and connector portion comprises a D-shaped ring body.

In the swivel snaphook provided in the present invention, the hook and connector portion comprises a hook body in the shape of a curved hook.

In the swivel snaphook provided in the present invention, the hook and connector portion comprises a strap ring having the same structure and size as the strap mounting portion.

Beneficial Effects of the Invention

Beneficial Effects

The implementation of the swivel snaphook provided in the present invention can achieve the following beneficial effects: in the swivel snaphook provided in the present invention, the retainer comprises a support portion and a strap mounting portion, and the support portion comprises a base body connected to the strap mounting portion, a through hole passing through the base body, and a snap-in portion protruding from the surface of the base body and surrounding the through hole; and the hook comprises a hook and connector portion and an engaging portion, and the engaging portion comprises a connecting shaft connected to the hook and connector portion, and a snap-on portion. When the hook and the retainer are snap-fitted together, the snap-on portion surrounds the snap-in portion and is snap-fitted with the snap-in portion in an inverted manner. Specifically, the two bosses are symmetrically clamped between two opposite sides of the raised ring, and an inner side surface of the boss and a snapping boss of the raised ring abut against each other to form a snap fit. Therefore, the connecting shaft can be effectively prevented from rocking and swinging relative to the through hole, namely, the undesired collision between the connecting shaft and the through hole is avoided, thereby ensuring the stable mechanical properties of the connecting shaft and the through hole and prolonging the service life of the swivel snaphook. Furthermore, noises generated by the friction and collision between the connecting shaft and the through hole during use are avoided.

BRIEF DESCRIPTION OF THE DRAWINGS

Description of the Drawings

Figure 1:
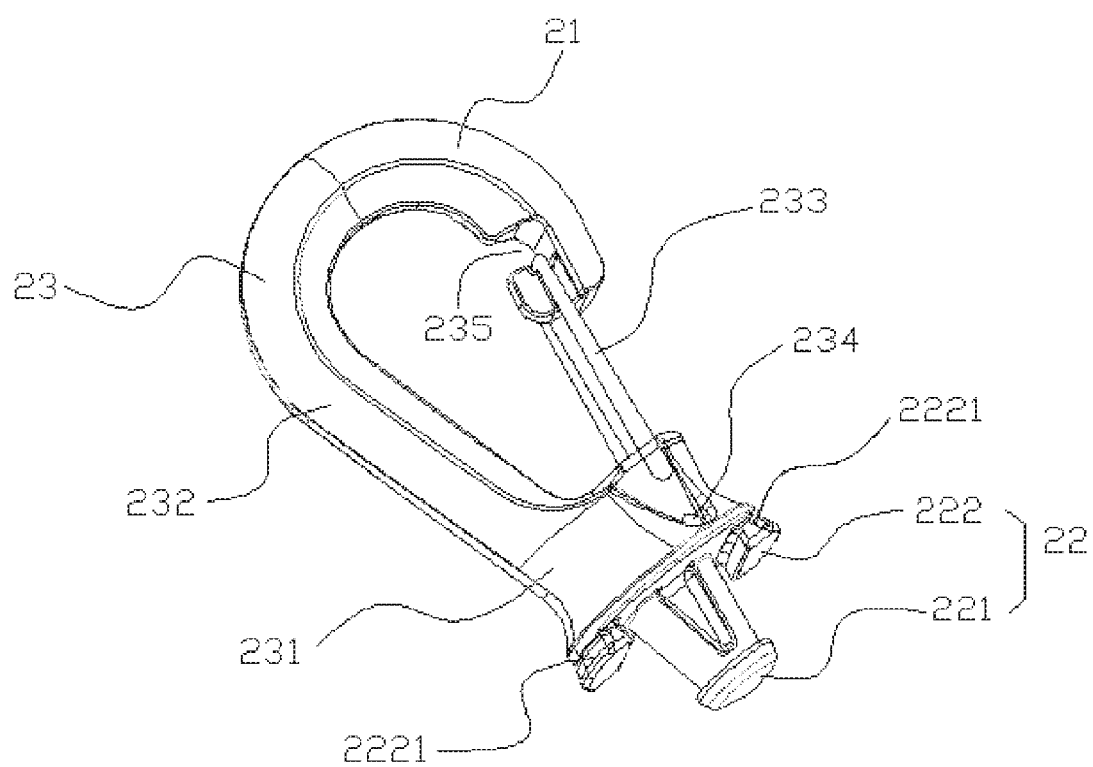
Figure 2:
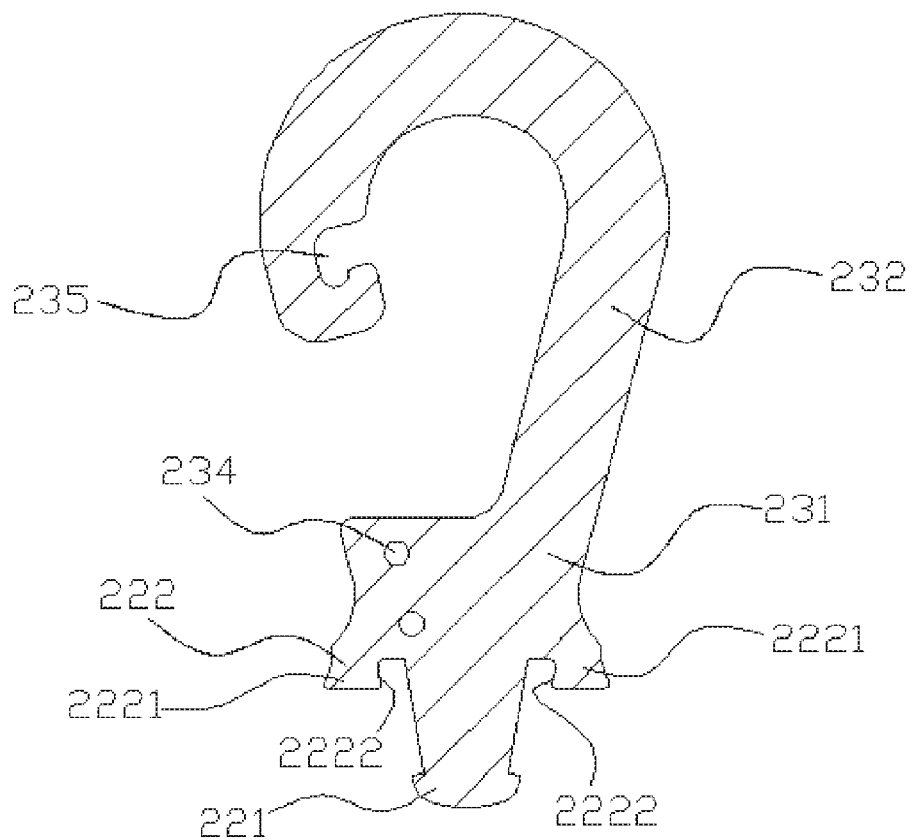
Figure 3:
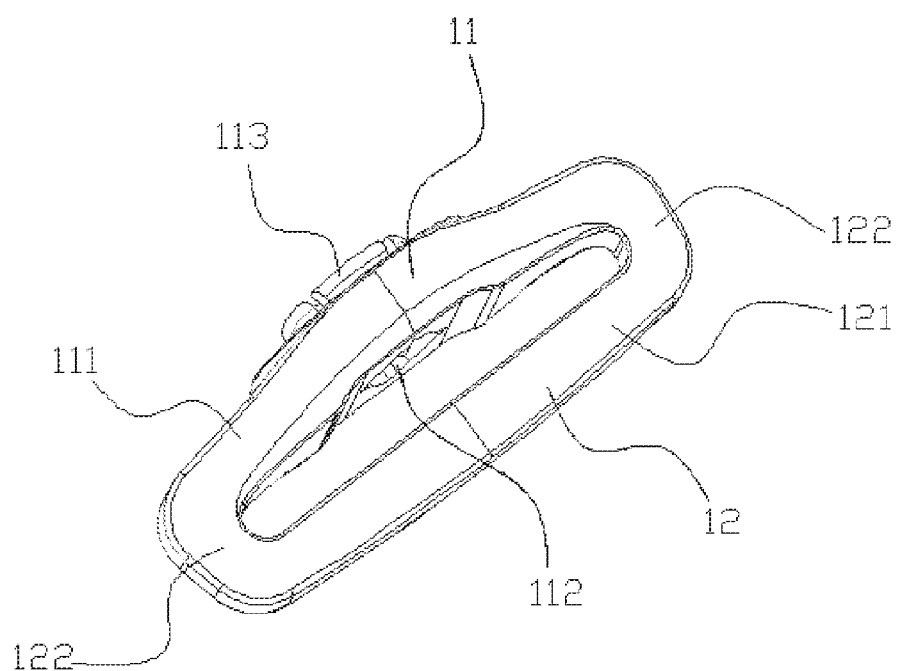
Figure 4:
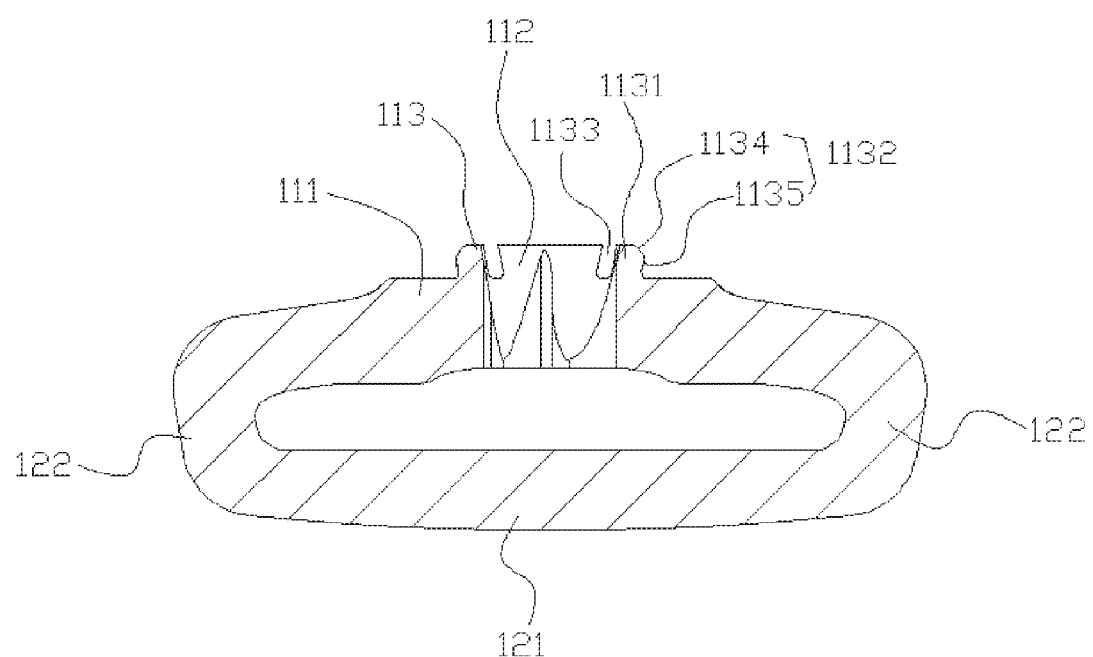
Figure 5:
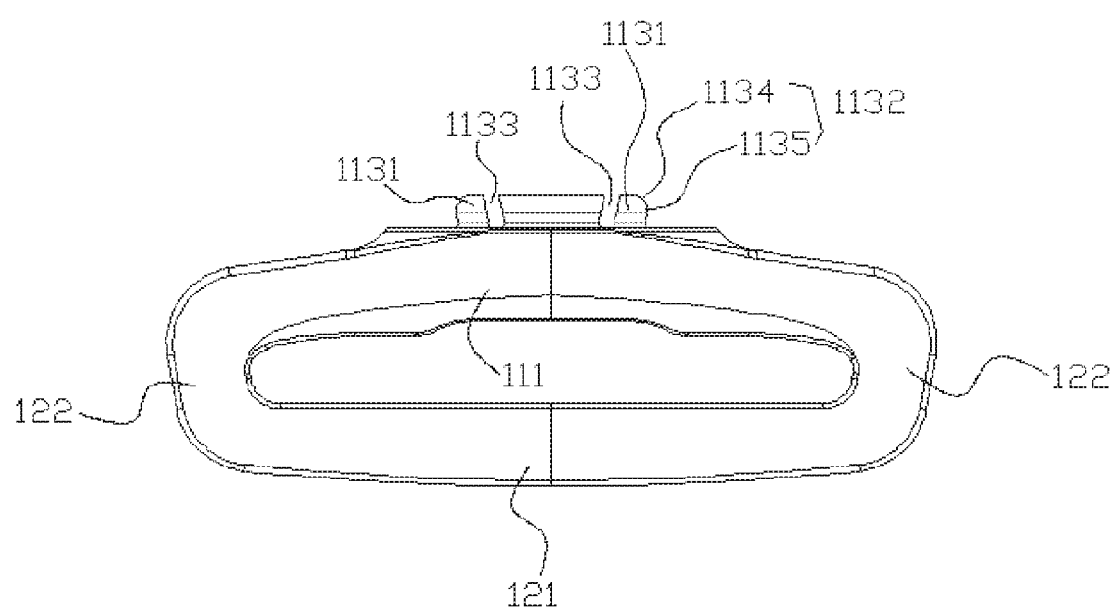
Figure 6:
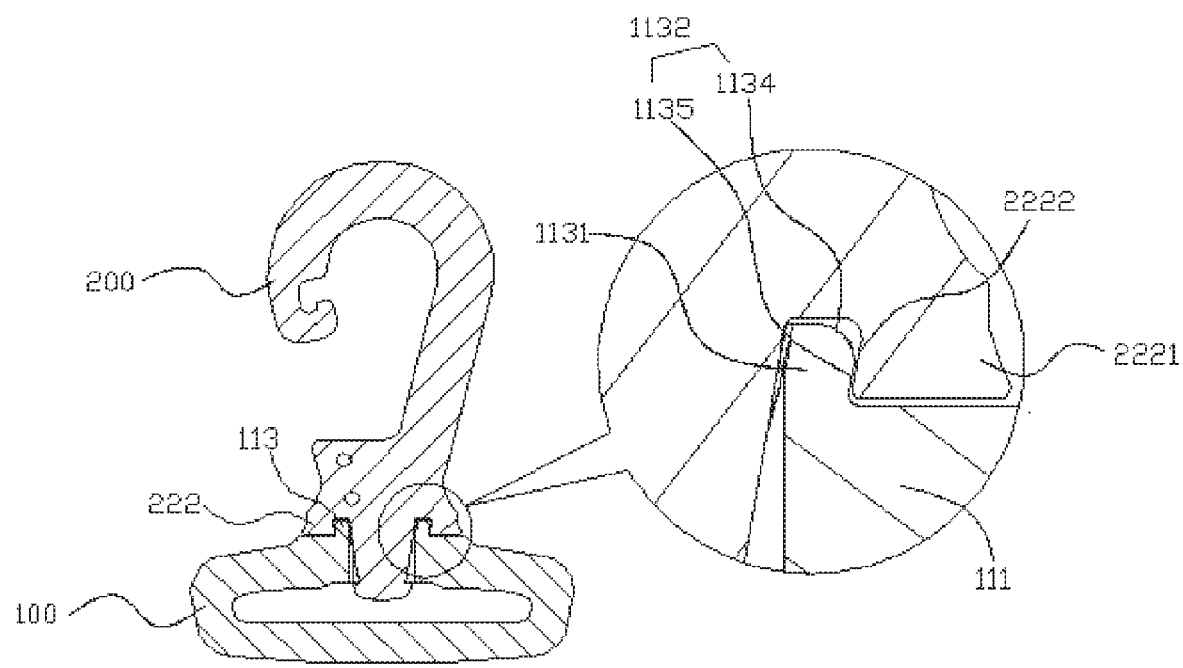
Figure 7:
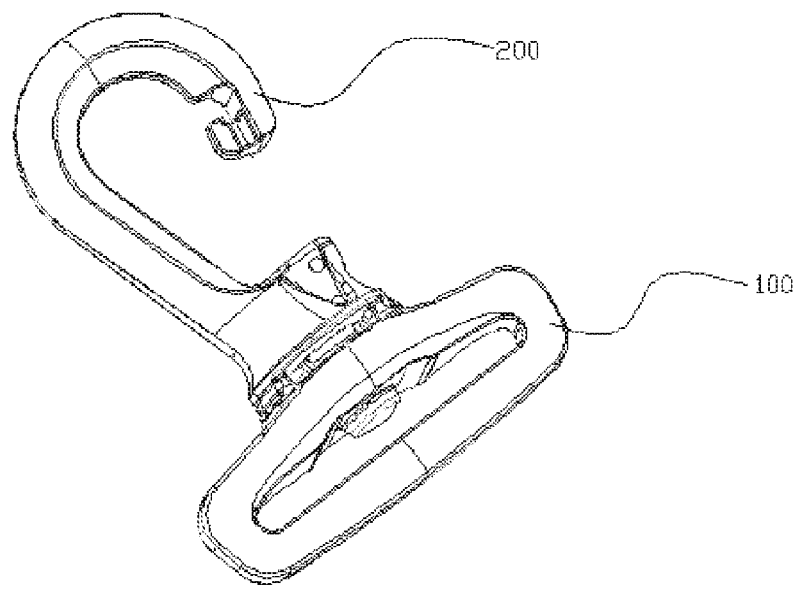
Figure 8:
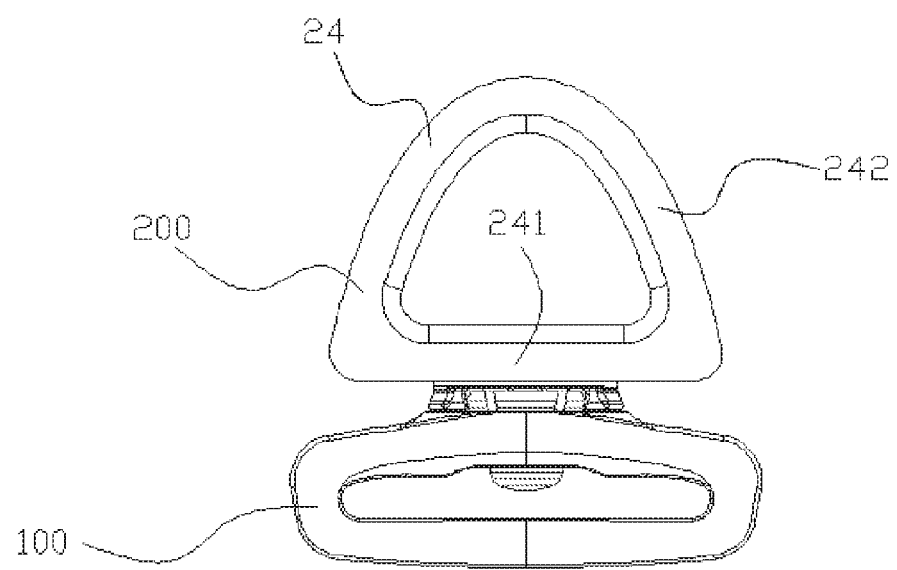
Figure 9:
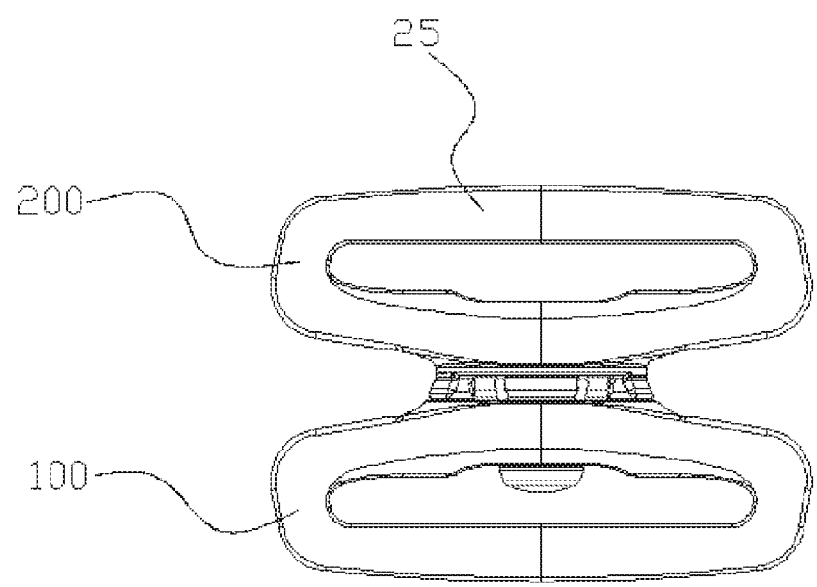

FIG. 1 is a schematic perspective view of a hook according to the first embodiment of the present invention;
FIG. 2 is a schematic sectional view of the hook according to the first embodiment of the present invention;
FIG. 3 is a schematic perspective view of a retainer according to the first embodiment of the present invention;
FIG. 4 is a schematic sectional view of the retainer according to the first embodiment of the present invention;
FIG. 5 is a front view of the retainer according to the first embodiment of the present invention;
FIG. 6 is a schematic sectional view of the retainer and the hook in a snap-fitted state according to the first embodiment of the present invention;
FIG. 7 is a schematic perspective view of the retainer and the hook in a snap-fitted state according to the first embodiment of the present invention;
FIG. 8 is a schematic perspective view of a retainer and a hook in a snap-fitted state according to the fourth embodiment of the present invention; and
FIG. 9 is a schematic perspective view of a retainer and a hook in a snap-fitted state according to the fifth embodiment of the present invention.

DESCRIPTION OF REFERENCE NUMERALS IN THE PARTICULAR EMBODIMENTS

TABLE 1

| Retainer | 100 | Hook | 200 |
|---|---|---|---|
| Support portion | 11 | Strap mounting portion | 12 |
| Base body | 111 | Through hole | 112 |
| Snap-in portion | 113 | | |
| Raised ring | 1131 | Snapping boss | 1132 |
| Notch | 1133 | Arc-shaped surface | 1134 |
| Abutting surface | 1135 | Cross bar | 121 |
| Lateral bar | 122 | | |

TABLE 1-continued

| Hook and connector portion | 21 | Engaging portion | 22 |
|---|---|---|---|
| Hook body | 23 | Ring body | 24 |
| Strap ring | 25 | | |
| Connecting shaft | 221 | Snap-on portion | 222 |
| Boss | 2221 | Inner side surface | 2222 |
| Head portion | 231 | Hook portion | 232 |
| Spring | 233 | Via hole | 234 |
| Lap joint portion | 235 | | |
| Straight bar | 241 | Arc-shaped bar | 242 |

Embodiments of the Invention

DETAILED DESCRIPTION OF EMBODIMENTS

In order to understand the technical features, objectives, and effects of the present invention more clearly, the particular embodiments of the present invention are described in detail with reference to the accompanying drawings. Obviously, the described embodiments are merely some rather than all of the embodiments of the present invention. Based on the embodiments of the present invention, all other embodiments obtained by a person of ordinary skill in the art without involving any inventive effort shall fall within the protection scope of the present invention.

First Embodiment

As shown in FIG. 7, this embodiment provides a swivel snaphook, which comprises a hook 200 and a retainer 100. The retainer 100 and the hook 200 are snap-fitted together, and the retainer 100 and the hook 200 can swivel relative to each other after being snap-fitted, so that the swivel snaphook is more flexible during use. Furthermore, the retainer 100 and the hook 200 have an integral structure made of a plastic material. It may be understood that the material of the retainer 100 and the hook 200 is not merely limited to a plastic or resin material, and may be a metal material, a composite material of resin and metal or, in addition to these, another common material.

As shown in FIG. 3 to FIG. 5, the retainer 100 comprises a support portion 11 used to connect the hook 200 and a strap mounting portion 12 used to connect a fabric strap. Specifically, the strap mounting portion 12 comprises a cross bar 121, and two lateral bars 122 respectively bending and extending from two ends of the cross bar 121. The two lateral bars 122 are respectively connected to two ends of the support portion 11. The support portion 11 and the cross bar 121 are disposed opposite each other. The support portion 11, the cross bar 121, and the two lateral bars 122 enclose a connecting cavity. The fabric strap passes through the connecting cavity and is then tied on the lateral bar 122, so that the fabric strap and the strap mounting portion 12 are engaged.

In this embodiment, the support portion 11 comprises a base body 111 with two ends respectively connected to the two lateral bars 122, a through hole 112 passing through the base body 111, and a snap-in portion 113 protruding from the surface of the base body 111 and surrounding the through hole 112. The snap-in portion 113 comprises a raised ring 1131 protruding from the surface of the base body 111, and a snapping boss 1132 extending outward from a tail end of the raised ring 1131.

As shown in FIG. 1 and FIG. 2, the hook 200 comprises a hook and connector portion 21 used to hook an object, and an engaging portion 22 connected to the hook and connector portion 21. Specifically, the hook and connector portion 21 comprises a hook body 23 in the shape of a curved hook. The hook body 23 comprises an approximately column-shaped head portion 231, an arc-shaped hook portion 232 extending and bending from an end of the head portion 231, and a spring 233 connecting the head portion 231 and the hook portion 232. The head portion 231 has two tiny via holes 234. One end of the spring 233 is mounted in the two via holes 234. A lap joint portion 235 recessed from an inner side surface 2222 of the hook portion 232 is provided at a tail end of the hook portion 232. The other end of the spring 233 is accommodated in the lap joint portion 235. When we apply to the spring 233 a force towards the hook portion 232, the end of the spring 233 that is accommodated in the lap joint portion 235 is detached from the hook portion 232. In this case, an object can be hung on the hook portion 232, so that the object and the hook and connector portion 21 are engaged.

In this embodiment, the engaging portion 22 comprises a connecting shaft 221 connected to the head portion 231, and a snap-on portion 222. The connecting shaft 221 is column-shaped, and has a main body portion with a radial width gradually decreasing in a direction away from the head portion 231 and has a flat flaring portion that is connected to a main body tail end and has a radial width greater than that of the main body tail end. The snap-on portion 222 comprises two symmetrical bosses 2221 (certainly, in another embodiment, the snap-on portion 222 may comprise three or more bosses 2221, provided that the plurality of bosses 2221 are arranged in a centrosymmetric manner) located on two opposite sides of the connecting shaft 221. The boss 2221 has an inner side surface 2222 forming an acute angle with respect to a vertical plane. The inner side surface 2222 inclines towards the connecting shaft 221.

As shown in FIG. 6, when the hook 200 and the retainer 100 are snap-fitted together, the connecting shaft 221 is rotatably inserted in the through hole 112. Specifically, the main body portion is accommodated in the through hole 112. The flaring portion extends into or completely extends into the connecting cavity to enable the retainer 100 and the hook 200 to be snap-fitted in place. The snap-on portion 222 surrounds the snap-in portion 113 and is snap-fitted with the snap-in portion 113. Specifically, the two bosses 2221 are symmetrically clamped between two opposite sides of the raised ring 1131, and the inner side surface 2222 of the boss 2221 and the snapping boss 1132 of the raised ring 1131 abut against each other to form a snap fit. Therefore, the connecting shaft 221 can be effectively prevented from rocking and swinging relative to the through hole 112, namely, the undesired collision between the connecting shaft 221 and the through hole 112 is avoided, thereby ensuring the stable mechanical properties of the connecting shaft 221 and the through hole 112 and prolonging the service life of the swivel snaphook. Furthermore, noises generated by the friction and collision between the connecting shaft 221 and the through hole 112 during use are avoided.

In this embodiment, the snapping boss 1132 comprises a smooth arc-shaped surface 1134 connected to the raised ring 1131, and an abutting surface 1135 extending from an end of the arc. Therefore, when the hook 200 and the retainer 100 are snap-fitted, the inner side surface 2222 of the boss 2221 may slide smoothly along the arc-shaped surface 1134 and eventually abut against the abutting surface 1135, such that the snap-in portion 113 and the clamping portion are snap-fitted more smoothly.

Further, in this embodiment, the snap-in portion 113 has four notches 1133 (certainly, in another embodiment, there may be two or more notches 1133) recessed from an end surface of the raised ring 1131, so that the raised ring 1131 has a petal form. The advantages of such a design lie in that: when the snap-in portion 113 and the snap-on portion 222 are snap-fitted, the inner side surface 2222 of the boss 2221 exerts a pressing force on the raised ring 1131, and the raised ring 1131 definitely deforms under the effect of the force. The notches 1133 provide a deformation space for the deformation of the raised ring 1131, so that the raised ring 1131 deforms and recovers more easily. Moreover, the snap-on portion 222 is more easily snap-fitted with the snap-in portion 113.

In this embodiment, the width of the boss 2221 is configured to be greater than the radial width of the connecting shaft 221 to increase an abutting area between the boss 2221 and the snapping boss 1132, so that the fit between the snap-in portion 113 and the clamping portion is more stable, and the collision between the connecting shaft 221 and the through hole 112 is thus better prevented.

In conclusion, the implementation of the swivel snaphook provided in this embodiment has the following beneficial effects:

1. when the hook 200 and the retainer 100 are snap-fitted together, the snap-on portion 222 surrounds the snap-in portion 113 and is snap-fitted with the snap-in portion 113. Specifically, the two bosses 2221 are symmetrically clamped between two opposite sides of the raised ring 1131, and the inner side surface 2222 of the boss 2221 and the snapping boss 1132 of the raised ring 1131 abut against each other to form a snap fit in an inverted manner. Therefore, the connecting shaft 221 can be effectively prevented from rocking and swinging relative to the through hole 112, namely, the undesired collision between the connecting shaft 221 and the through hole 112 is avoided, thereby ensuring the stable mechanical properties of the connecting shaft 221 and the through hole 112 and prolonging the service life of the swivel snaphook. Furthermore, noises generated by the friction and collision between the connecting shaft 221 and the through hole 112 during use are avoided.

2. The snapping boss 1132 comprises the smooth arc-shaped surface 1134 connected to the raised ring 1131, and the abutting surface 1135 extending from an end of the arc. Therefore, when the hook 200 and the retainer 100 are snap-fitted, the inner side surface 2222 of the boss 2221 may slide smoothly along the arc-shaped surface 1134 and eventually abut against the abutting surface 1135, such that the snap-in portion 113 and the clamping portion are snap-fitted more smoothly in an inverted manner.

3. The snap-in portion 113 has four notches 1133 recessed from the end surface of the raised ring 1131. When the snap-in portion 113 and the snap-on portion 222 are snap-fitted, the notches 1133 provide a deformation space for the deformation of the raised ring 1131, so that the raised ring 113 1 deforms and recovers more easily. Moreover, the snap-on portion 222 and the snap-in portion 113 are snap-fitted more easily in an inverted manner.

4. The width of the boss 2221 is configured to be greater than the radial width of the connecting shaft 221 to increase the abutting area between the boss 2221 and the snapping boss 1132, so that the fit between the snap-in portion 113 and the clamping portion is more stable, and the collision between the connecting shaft 221 and the through hole 112 is thus better prevented.

Second Embodiment

This embodiment provides a swivel snaphook which is different from that in the first embodiment in that:

the boss 2221 has a protrusion protruding from the surface of the boss 2221 that faces the connecting shaft 221. When the hook 200 and the retainer 100 are snap-fitted, the protrusion is located between the snapping boss 1132 and the surface of the base body 111, so that the protrusion and the snapping boss 1132 abut against each other to form a snap fit in an inverted manner.

Compared with the first embodiment, the fit between the boss 2221 and the snapping boss 1132 is more stable and reliable, so that not only the relative collision between the connecting shaft 221 and the through hole 112 can be avoided, and to a certain extent the hook 200 is also prevented from being detached from the retainer 100.

Third Embodiment

This embodiment provides a swivel snaphook which is different from that in the first embodiment in that: the plurality of bosses 2221 are joined to each other to form an annular boss.

Compared with the first embodiment, when the hook 200 and the retainer 100 are snap-fitted, the annular boss formed by the plurality of bosses 2221 may completely cover the snapping boss 1132 to increase the abutting area between the boss 2221 and the snapping boss 1132 to the greatest extent, so that the fit between the snap-on portion 222 and the snap-in portion 113 is more stable, and the relative collision between the connecting shaft 221 and the through hole 112 is better prevented.

Fourth Embodiment

This embodiment provides a swivel snaphook. Referring to FIG. 8, the swivel snaphook in this embodiment is different from that in the first embodiment in that: the hook and connector portion 21 comprises a D-shaped ring body 24. The ring body 24 comprises a straight bar 241, and arc-shaped bars 242 connected to two ends of the straight bar 241. The engaging portion 22 comprises the connecting shaft 221 connected to the straight bar 241, and the snap-on portion 222. The ring body 24 is suitable for tethering, for example without limitation, a long and thin rope.

Fifth Embodiment

This embodiment provides a swivel snaphook. Referring to FIG. 9, the swivel snaphook in this embodiment is different from that in the first embodiment in that: the hook and connector portion 21 comprises a strap ring 25 having the same structure and size as the strap mounting portion 12. The strap ring 25 is suitable for tethering, for example without limitation, a flat strap-shaped object.

The embodiments of the present invention are described above with reference to the accompanying drawings. However, the present invention is not limited to the foregoing particular embodiments. The foregoing particular embodiments are merely illustrative rather than limitative. In light of the teachings of the present invention, a person of ordinary skill in the art may further use various forms without departing from the spirit and the protection scope of the claims of the present invention, and these forms all fall within the protection scope of the present invention.

The invention claimed is:

1. A swivel snaphook, comprising:
   a hook comprising a hook and connector portion configured for hooking an object or connecting a fabric strap, and an engaging portion connected to the hook and connector portion, the engaging portion comprising a connecting shaft connected to the hook and connector portion, and a snap-on portion; and
   a retainer configured to be snap-fitted together with the hook, the retainer comprising a support portion and a strap mounting portion configured to connect a fabric strap, the support portion comprising a base body connected to the strap mounting portion, a through hole passing through the base body, and a snap-in portion protruding from a surface of the base body and surrounding the through hole;
   wherein the snap-on portion surrounds the snap-in portion and is snap-fitted with the snap-in portion, and wherein the connecting shaft is rotatably inserted in the through hole,
   wherein the snap-in portion comprises a raised ring protruding from the surface of the base body, and a snapping boss extending outward from a tail end of the raised ring; the snap-on portion comprises a plurality of bosses arranged surrounding the connecting shaft in a centrosymmetric manner; and
   when the hook and the retainer are snap-fitted, the plurality of bosses and the snapping boss abut against each other, such that the snap-in portion and the snap-on portion are snap-fitted together in an inverted manner.

2. The swivel snaphook according to claim 1, wherein the snap-in portion further comprises a plurality of notches recessed from an end surface of the raised ring.

3. The swivel snaphook according to claim 1, wherein
   each boss of the plurality of bosses has an inner side surface forming an acute angle with respect to a vertical plane;
   the snapping boss has a smooth arc-shaped surface connected to the raised ring, and an abutting surface extending from an end of the arc-shaped surface; and
   when the hook and the retainer are snap-fitted, the inner side surface abuts against the abutting surface.

4. The swivel snaphook according to claim 1, wherein the plurality of bosses of the snap-on portion comprises two bosses configured opposite each other, and wherein a width of the two bosses is greater than a radial width of the connecting shaft.

5. The swivel snaphook according to claim 1, wherein the plurality of bosses are joined to each other to form an annular boss.

6. The swivel snaphook according to claim 1, wherein each boss of the plurality of bosses has a protrusion protruding from a surface of the each boss that faces the connecting shaft; and when the hook and the retainer are snap-fitted, the protrusion is snap-fitted with the snapping boss.

7. The swivel snaphook according to claim 1, wherein the hook and connector portion comprises a D-shaped ring body.

8. The swivel snaphook according to claim 1, wherein the hook and connector portion comprises a hook body in a shape of a curved hook.

9. The swivel snaphook according to claim 1, wherein the hook and connector portion comprises a strap ring having a structure and size equal to a structure and size of the strap mounting portion.

* * * * *